Figures 1, 2, 3, 4:
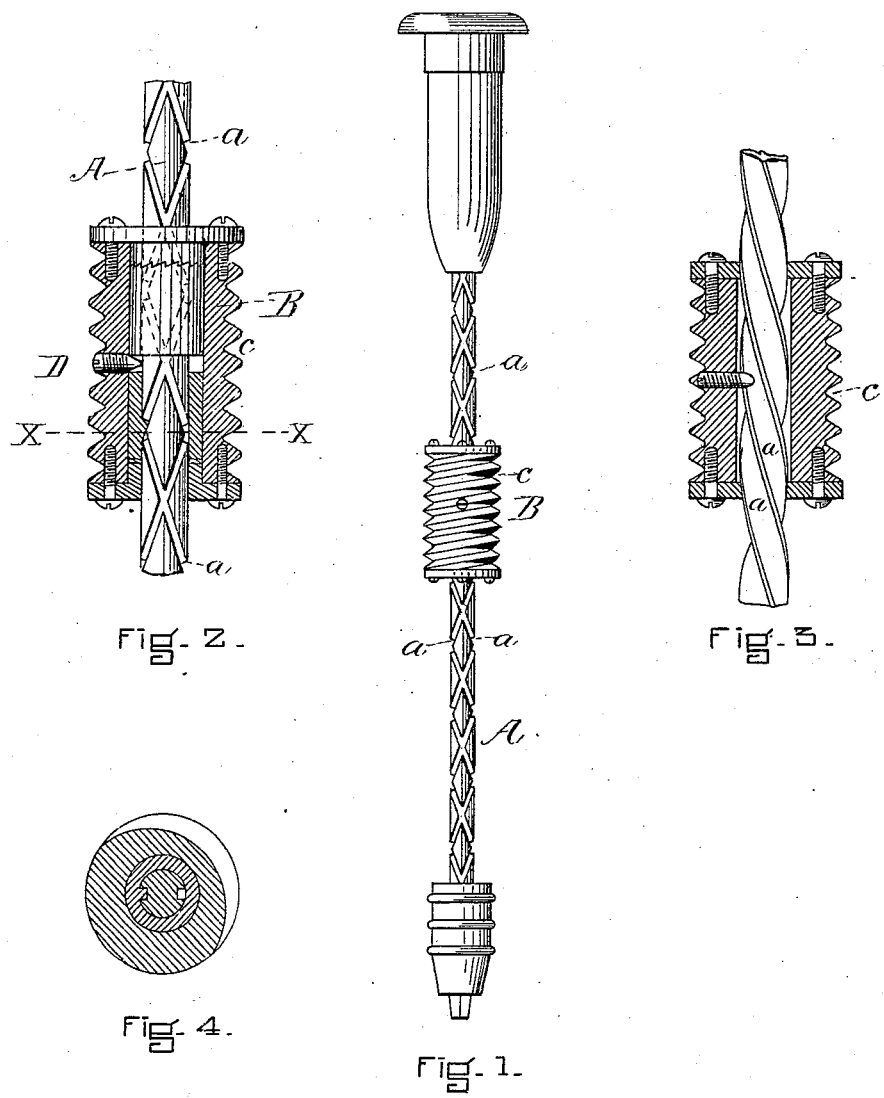

(No Model.)

D. F. BARBER.
HAND DRILL.

No. 284,799. Patented Sept. 11, 1883.

WITNESSES

INVENTOR

UNITED STATES PATENT OFFICE.

D. FLETCHER BARBER, OF NEWTON, ASSIGNOR OF ONE-HALF TO ALBERT M. GARDNER, OF BOSTON, MASSACHUSETTS.

HAND-DRILL.

SPECIFICATION forming part of Letters Patent No. 284,799, dated September 11, 1883.

Application filed February 3, 1883. (No model.)

*To all whom it may concern:*

Be it known that I, D. FLETCHER BARBER, of Newton, in the county of Middlesex and State of Massachusetts, a citizen of the United States, have made a new and useful Improvement in Drill-Stocks, of which the following is a full, clear, and exact description, reference being had to the accompanying drawings, forming a part of this specification, in explaining its nature, in which—

Figure 1 is an elevation of a drill-stock containing the features of my invention. Fig. 2 is a vertical section, enlarged, of a drill-stock handle and a portion of the drill-stock shaft, adapted to be used as hereinafter described. Fig. 3 is a cross-section thereof upon the line $x\,x$ of Fig. 2, and Fig. 4 represents the application of my invention to an ordinary drill-stock spindle.

My invention relates to that class of drill-stocks now made to drive drills in any given direction by moving a handle or pulley forward and back on a shaft or spindle fitted with one or more grooves or threads with which the pulley or handle engages; and it consists in providing said pulley or handle with means whereby it may be used additionally with a bow. This handle or pulley may have grooves or threads formed in its exterior surface to receive the cord of the bow; or it may be formed with a plain cylindrical surface with flanges at either end to prevent the cord from slipping therefrom. It may be fastened rigidly to the drill shaft or spindle, or it may travel up and down thereon, as preferred.

Referring to the drawings, A represents the drill-stock shaft or spindle. B is the handle or pulley. $c$ are the threads or grooves thereon. $a$ are the grooves or threads in the shaft or spindle.

When the invention is applied to the drill known as the "Chicopee drill," patented to J. H. Hoague, August 15, 1882, No. 262,771, the handle may be rigidly secured to the shaft or spindle A by a set-screw, D, which passes through the handle or pulley and separates the ratchets which enter the grooves or threads thereon, and thereby lock the handle to the shaft or spindle. The screw may extend sufficiently to engage with the shaft or spindle, if desired.

When an ordinary handle like that shown in Fig. 4 is employed, I may use for fastening it to the shaft or spindle one or more set-screws, which shall engage therewith. Any other desirable means, however, may be employed for securing this handle or pulley rigidly to the shaft.

If it is desired to work the drill by hand, it is operated in the usual manner, as the handle can be moved up and down, as though it were not adapted to be run by the bow-string.

If it is desired to use the bow-string, the handle may be fastened by the set-screw to the shaft or not, as desired. Preferably it is advisable to fasten it to the spindle, and by this means I am enabled to run an ordinary drill-stock at greater speed, and this without adding very materially to the cost of the construction of the drill. Another advantage obtained by this construction is that the handle or pulley can be adjusted at any desirable distance from the drill, thereby enabling the operator to use the bow at all times, and reach some of the work he otherwise could not.

In operation the cord is wound about the pulley or handle and the bow moved transversely, as in the ordinary bow-drill, and, as above stated, in lieu of a threaded or grooved surface, the handle or pulley may have a plane surface with flanges to hold the string thereon.

Having thus fully described my invention, I claim and desire to secure by Letters Patent of the United States—

1. A drill-stock having a shaft or spindle and a pulley or handle, B, provided with the thread or groove $c$, as and for the purposes described.

2. The combination of the grooved or threaded shaft or spindle of a drill-stock, a handle adapted to be worked by hand or by a bow-string, and means for rigidly securing said handle to the shaft to prevent its movement thereon, all substantially as and for the purposes described.

3. The combination, in a drill, of the threaded or grooved shaft or spindle, a handle adapted to be used in connection with a bow-string, as specified, and means for adjusting the position of said handle upon the shaft or spindle, and for locking it thereto, all substantially as and for the purposes described.

D. FLETCHER BARBER.

Witnesses:
A. M. GARDNER,
F. F. RAYMOND, 2d.